Patented Jan. 5, 1926.

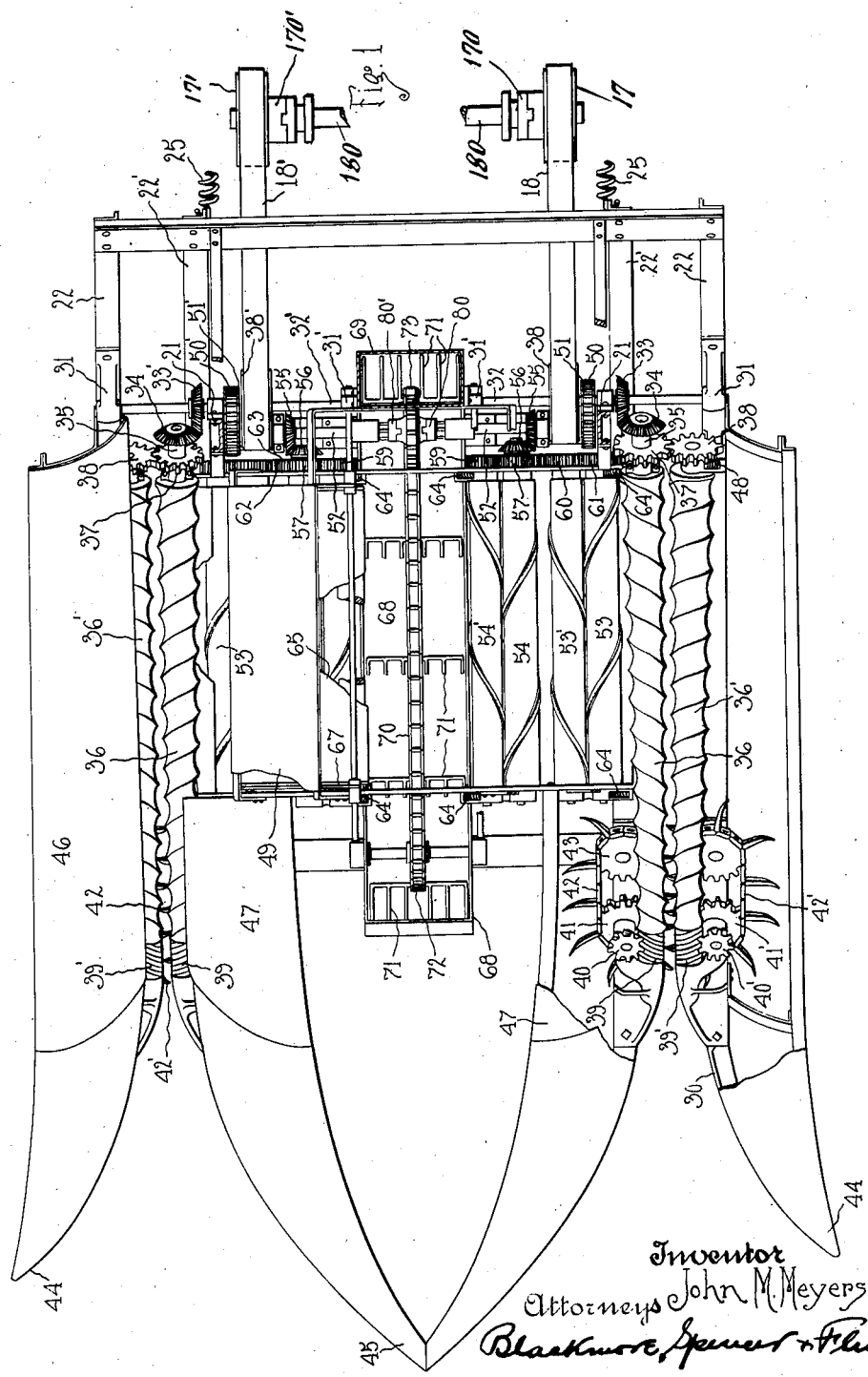

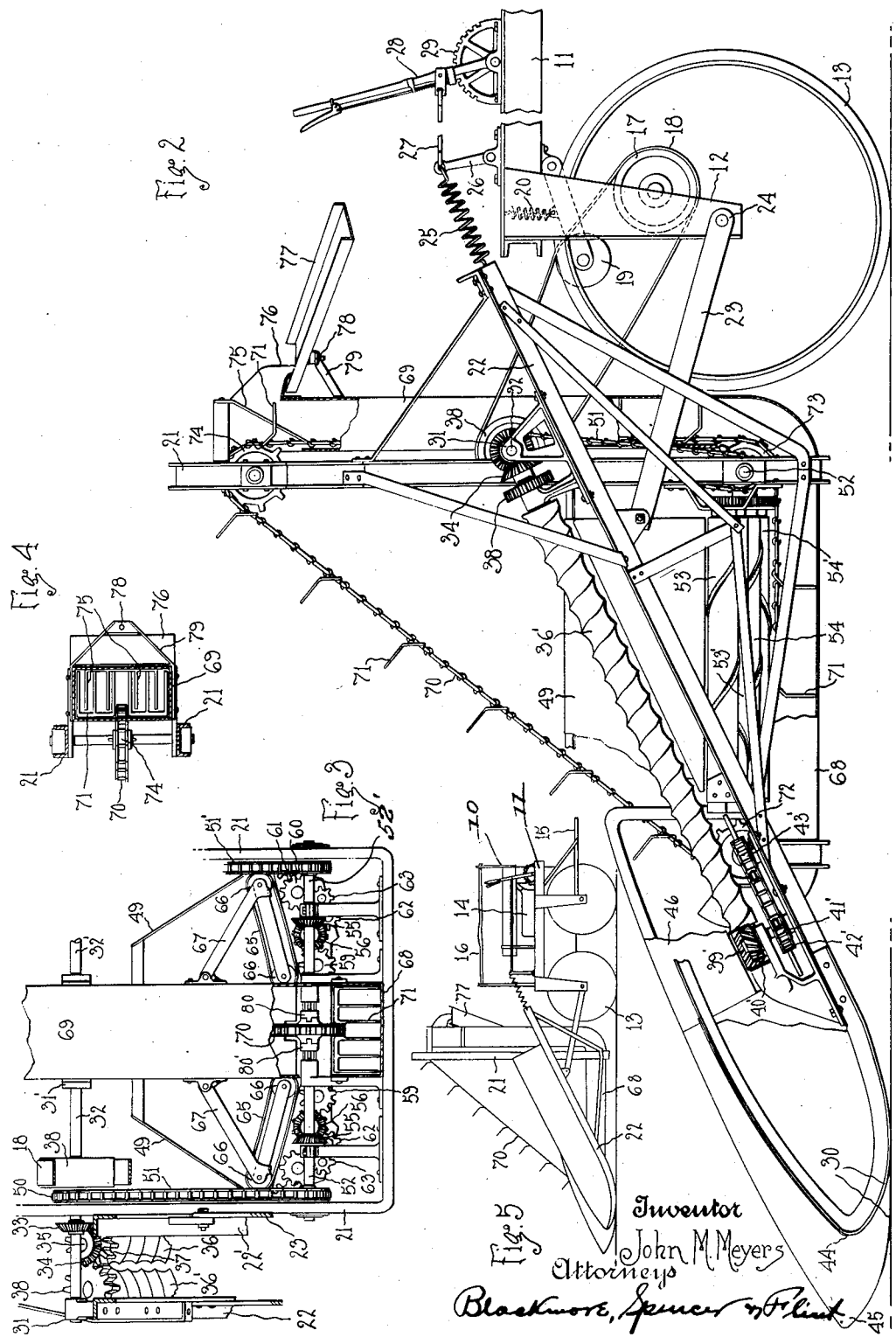

1,568,683

UNITED STATES PATENT OFFICE.

JOHN M. MEYERS, OF JANESVILLE, WISCONSIN, ASSIGNOR TO DURANT ENGINEERING CORPORATION, OF NEW YORK, N. Y., A CORPORATION OF DELAWARE.

CORN HARVESTER.

Application filed February 9, 1920. Serial No. 357,492.

*To all whom it may concern:*

Be it known that I, JOHN M. MEYERS, a citizen of the United States, and a resident of Janesville, county of Rock, and State of Wisconsin, have invented certain new and useful Improvements in Corn Harvesters, of which the following is a full, clear, concise, and exact description, such as will enable others skilled in the art to which the invention relates to make and use the same, reference being made therein to the accompanying drawings, which form a part of this specification.

The invention relates to a harvesting implement of the type employed generally for harvesting corn and known to the trade as corn pickers. These pickers usually include means for guiding the stalks to and subjecting them to the action of what are known as snapping rolls whereby the ears are removed from the stalks, the latter being left standing as the machine travels over the field. The ears are then carried by a conveyor to husking rolls, the husked ears being then delivered to some point of discharge from which they may fall into a wagon alongside the picker. The machines of this type in general use are horse-drawn machines, and are designed to operate upon one row of corn only, the weight of the machine being such as to preclude the multiplication of parts and increase of size necessary to operate upon more than one row. Furthermore, these machines frequently fail to function properly due to the fact that, when operating in dry or frosted corn, the stalks will frequently break and portions thereof will fall with the ears into the conveyor which becomes clogged with the accumulating mass of material.

Some of the salient features wherein I have contemplated making improvements over the prior art by means of my invention may be stated briefly as follows:

(1) Combining a corn picker with a tractor, thereby obviating the necessity for the use of horses to draw the machine.

(2) The construction of a picker adapted to operate simultaneously upon a plurality of rows of corn.

(3) The driving of the mechanism on the picker from the engine of the tractor.

(4) The arrangement of the husking rolls adjacent to the snapping rolls whereby the delivery of the ears and any accompanying portions of stalks to the husking rolls is greatly simplified.

(5) The attachment of the picker frame to the tractor by means permitting the picker to float over the surface of the ground, and including a ground shoe on the picker and spring means for determining the weight to be carried by the shoe.

(6) The provision of gathering chains arranged to be driven directly by the snapping rolls.

(7) Improved husking means including an apron adapted to hold the ears to the husking rolls.

(8) Apparatus for elevating the husked ears including means whereby the ears may be delivered to either side of the picker, thus facilitating the delivery to a wagon when operating adjacent fences or other obstructions.

With the object of improving the construction of machines of this type in respect to the features mentioned above as well as in other respects as will more fully appear from the following description, the invention comprises the features of novelty hereinafter described and set forth in the claims hereto appended.

While I have above referred to a corn picker and shall hereinafter describe an implement of that type as showing the preferred embodiment of the features of construction in which my invention resides, it will be evident that the invention in some respects is not limited to use in connection with such implements and furthermore that various modifications and substitutions may be made in arrangement and structure of parts without departing from the spirit and scope of the invention.

In the accompanying drawings:

Fig. 1 is a plan view of a corn picker embodying one form of my invention.

Fig. 2 is a side elevation of the same, parts being shown in section.

Fig. 3 is a rear elevation of the picker, parts being cut away and sectioned in order to show details.

Fig. 4 is a horizontal section through the upper part of the conveyor, and

Fig. 5 is an elevation showing somewhat diagrammatically the relationship of the picker to the tractor.

In the drawings 10 indicates a tractor which may be of any desired or usual form. The tractor I have shown is of the type comprising four traction wheels mounted upon axes which are fixed with reference to the frame, steering being accomplished by varying the relative rate or direction of rotation of the wheels on opposite sides. In the particular embodiment shown I have found it convenient to mount the corn picker on what would be normally the rear end of the tractor, the reversal of the direction of travel being quite immaterial with this type of tractor. It will be understood however that, with slight changes within the ability of the mechanic, the picker structure may be mounted upon any ordinary type of tractor and upon either end as convenience may suggest.

The tractor 10 includes a frame 11 having depending portions 12 in which driving wheels 13 are suitably supported. These wheels may be driven by any usual or desired power transmitting connections from the engine 14. A platform 15 may be provided for the operator and such suitable operating devices 16 as may be necessary to enable the operator to actuate the usual control devices from his position on the platform.

Power pulleys 17, 17' are supported in any suitable location on the tractor and arranged to be driven by the engine. Flexible power transmitting elements 18, 18' shown for convenience as belts are arranged to be driven by the power pulleys and supply power to the moving parts on the picker. A tightener 19 actuated by a spring 20 is mounted on a suitable support, shown as located on the tractor frame, to maintain each belt taut under variations in distance between the driving and driven pulleys.

The frame of the picker includes main vertical members 21 and inclined members 22, 22' preferably of angle-iron, and connected and braced as may be necessary to constitute a rigid support for the picking, husking, and conveying mechanism. The frame is attached to the tractor by means including side bars 23, pivotally connected as at 24 to the tractor, a convenient point of attachment being at the axles of the driving wheels thus permitting bodily swinging movement of the frame relative to the tractor. Another point of attachment is provided by connecting springs 25 to the inclined frame and to an adjustable support, as the lever 26, which may be connected by a rod 27 to a hand-lever 28, co-operating with a notched segment 29. The frame members 22 are extended forwardly and ground-engaging shoes 30 are mounted thereon or on the central inclined frame members 22' or on both. The supporting means described is shown merely as an illustrative embodiment of some means which enables the operator to determine the proportion of the weight of the picker which shall be supported by the tractor, and the proportion which shall be carried by the ground-engaging shoes, and to enable the machine to be turned as required.

*The picker mechanism.*

In bearings 31, 31' on the picker frame are journaled main drive shafts 32, 32' on which are fixed beveled pinions 33, 33'. These pinions mesh with beveled pinions 34, fixed on shafts 35 which carry the inner snapping rolls 36. Shafts 35 also carry gears 37 meshing with gears 38 mounted upon the shaft carrying outer snapping rolls 36'. It will be seen that the respective snapping 36, 36' of each pair are rotated in opposite directions and have a fluted surface operating to run the stalks through between the rolls downwardly and remove the ears therefrom. As shown also the rolls are of greater diameter at the rear ends, thereby producing an increased peripheral velocity at the rear ends of the rolls, thus insuring the ejection of the stalks from the rolls before they reach the rear ends. The axes of the rolls of each pair, however, are inclined to each other at such an angle that the maximum width of the opening between the rolls remains approximately the same throughout the length of the rolls in order to maintain substantially the same gripping effect from one end to the other. The shafts 32, 32', are shown as being independently driven by belts 18, 18', which operate upon pulleys 38, 38', whereby the operator is enabled to interrupt the drive to either side at will by slackening the driving belts or by any conventional clutch or like control device, when it is desired to gather corn from only one row. As shown in Fig. 1, the belts are actuated by pulleys 17, 17', mounted loosely upon the driving shaft 180 and adapted to be independently connected to or disconnected from the shaft by clutches 170, 170'.

The snapping rolls are provided at their forward ends with worms or spiral gears 39, 39,' engaging respectively with worm wheels or spiral pinions 40, 40'. Rigidly connected to these pinions so as to be driven thereby are sprockets 41, 41', adapted to drive gathering chains 42, 42', of a common form, these chains being also guided upon sprockets 43, 43', so as to direct the corn stalks properly between the snapping rolls. Gathering or picker points 44, 45, are arranged in advance of the gathering chains and snapping rolls in order to assist in gathering down or tangled corn and direct the stalks to the snapping rolls. Shields 46, 47 may be arranged as shown to prevent stalks from becoming entangled in the picker mechanism shield 46 also throwing ears toward the husking rolls. Spring pressed bearings, as shown for example at 48, may be employed in connection with the snapping rolls in order to prevent breakage if obstructions of larger size than the stalks should pass between the rolls. An apron 49 may be arranged adjacent the snapping rolls in order to direct the ears to the husking rolls as they fall from the the snapping rolls.

The husking mechanism.

Sprockets 50, 50', mounted respectively upon main driving shafts 32, 32', are adapted to drive chains 51, 51', which pass over sprockets fixed upon shafts 52, 52', whereby the husking mechanism is operated. Two sets of husking rolls 53, 53', and 54, 54', are shown for each side of the mechanism. It will be understood that the number however may be varied. The husking rolls are arranged parallel to the direction of travel of the machine and between the snapping rolls, as shown, and below the level where ears are removed from the stalks by the snapping rolls. As a result the ears fall directly to the husking rolls from the snapping rolls, thus avoiding the necessity of elevating the ears by some form of conveyor, together with the attendant difficulties due to the presence of portions of leaves and stalks along with the ears.

The husking rolls may be driven from shafts, 52, 52', by bevel gears 55, 56, gear 56 being fixed upon the shaft of one of the rolls. A gear 57 fixed upon the same shaft may be arranged to mesh with a gear upon an adjoining shaft, as gear 59, thereby driving the associated roll 54' in a direction opposite to that of roll 54. The rolls 53, 53', are shown as being driven in a similar manner by means of a pair of small pinions 62, 63, so mounted as to derive motion from gear 57 and transmit it to gear 60 rigid with the roll 53', gear 60 meshing with gear 61 rigid with roll 53. Spring supported bearings, indicated at 64, may be employed for the husking rolls in order to prevent breakage in case stones or the like should reach the husking rolls. It will be understood that the particular number or structure of husking rolls or the arrangement of gears to operate the same are not material to my invention and may be varied as desired.

A flexible belt or apron 65 is arranged above the husking rolls to retain the ears in engagement with the rolls and thereby facilitate the husking operation. This belt is preferably arranged in the form of an endless belt passing around rollers 66 supported in a suitable frame 67. The belt may be positively driven if desired.

The conveyor mechanism.

As the ears from which the husks have been removed leave the husking rolls they fall into the trough 68, communicating at the rear end with the elevator leg 69. A chain 70, provided with flights 71, is arranged to travel in the trough and carry ears therefrom to the point of delivery at the upper end of leg 69. The chain is trained over sprockets 72, 73, 74, of which sprocket 73 is mounted coaxially with shafts 52, 52', and may be driven by either of these shafts by means of clutches 80, 80'. It will be understood that the conveyor is required to operate whether both sides of the machine be in operation to pick and husk corn, or only one side, hence the above-described means has been provided to enable the conveyor chain to be driven from either side.

At the upper end of the elevator leg is arranged some suitable means for discharging the ears from the flights 71. Such means is illustrated as comprising a grid or series of fingers 75 adapted to push the ears out to the side of the elevator casing, whence they fall through the outlet or spout 76. This spout is arranged to deliver to the chute 77 pivotally supported at 78 upon a bracket 79, so that the chute may be swung about the pivot, to deliver to a wagon at either side of the machine as may be found convenient. This will be particularly useful when the machine is operating in such close proximity to fences or the like that there is room for a wagon on one side only. It also enables the wagon to be kept always on the side on which corn has already been gathered, irrespective of the direction of travel of the picker.

I claim:

1. In a corn picker a plurality of sets of ear removing devices arranged to operate simultaneously upon two rows of corn, sets of husking devices arranged between said ear removing devices and adapted to receive ears directly therefrom, and a conveyor arranged between said sets of husking devices to receive ears from both of said sets.

2. In a corn picker the combination of a traveling frame, a picker frame supported in part thereby and connected thereto by means permitting said picker frame to swing vertically relatively to said traveling frame, additional supporting means on said picker frame adapted to travel in contact with the ground surface, and spring means interposed between said frames adapted to restrain yieldingly the downward swinging movement of said picker frame, the connections being such as to permit the picker frame normally to swing freely relatively to said traveling frame under the influence of gravity while restrained by said spring means.

3. In a corn picker the combination of a traveling frame, a picker frame pivotally connected to said traveling frame to swing vertically relatively thereto, adjustable connecting means for supporting said picker frame from said traveling frame and restraining downward pivotal movement of said picker frame, and spring means interposed in said connecting means and adapted to permit yieldingly restrained downward movement of said picker frame in passing over uneven surfaces.

4. In a picker the combination of a wheeled frame, a picker frame attached to said wheeled frame to have vertical swinging movement relative thereto, spring means adapted to restrain said swinging movement, means for adjusting said spring means, and a shoe on said picker frame adapted to travel in contact with the ground surface.

5. The combination of a tractor and a corn harvester, the said harvester comprising corn picking and husking means mounted upon a unitary frame, means for detachably connecting said frame to said tractor, said connecting means permitting vertical swinging movement of said frame relative to said tractor, and resilient means arranged to restrain such movement.

6. In a corn harvester, the combination of a tractor and a combined corn picking and husking mechanism mounted upon a unitary frame, said frame being connected to said tractor by means permitting swinging movement of said frame relative to said tractor.

7. In a corn harvester, the combination of two sets of ear removing mechanisms adapted to operate simultaneously upon two rows of corn, two sets of husking mechanisms, one arranged beside each set of ear removing mechanisms, and a conveyer arranged between said sets of husking mechanisms and adapted to receive husked ears from both sets.

In testimony whereof I affix my signature.

JOHN M. MEYERS.